March 10, 1936. W. M. SCHOLL 2,033,553
METHOD OF MAKING AND MOUNTING ADHESIVE FOOT TREATMENT ARTICLES
Filed Oct. 4, 1933 2 Sheets-Sheet 1
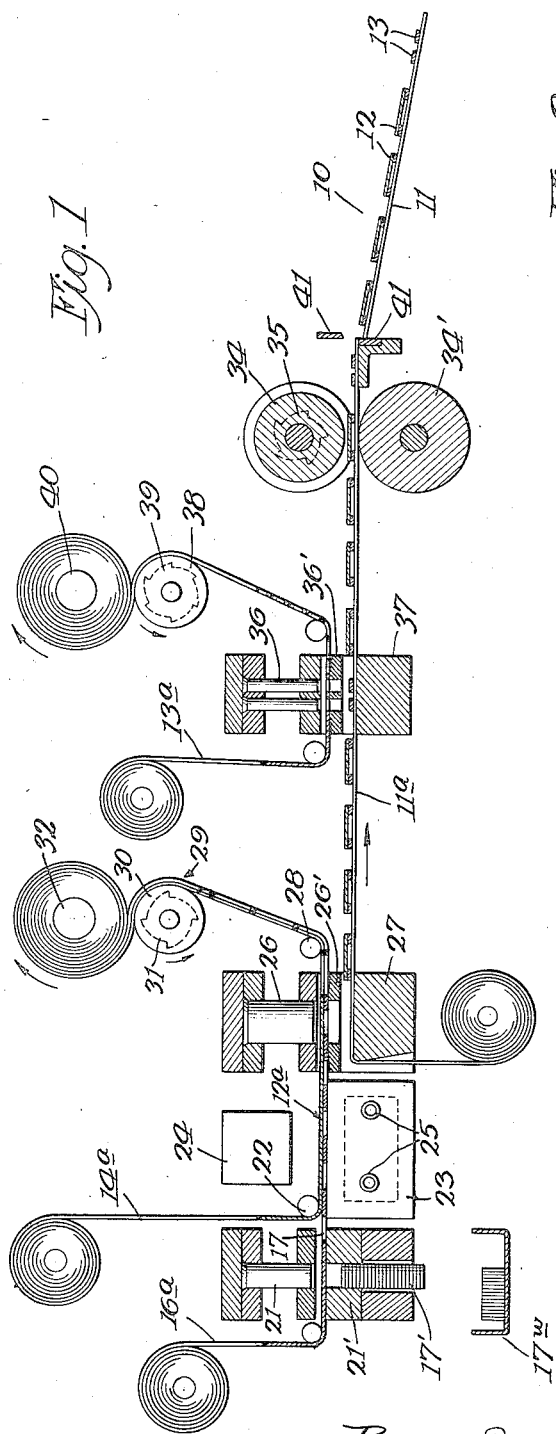
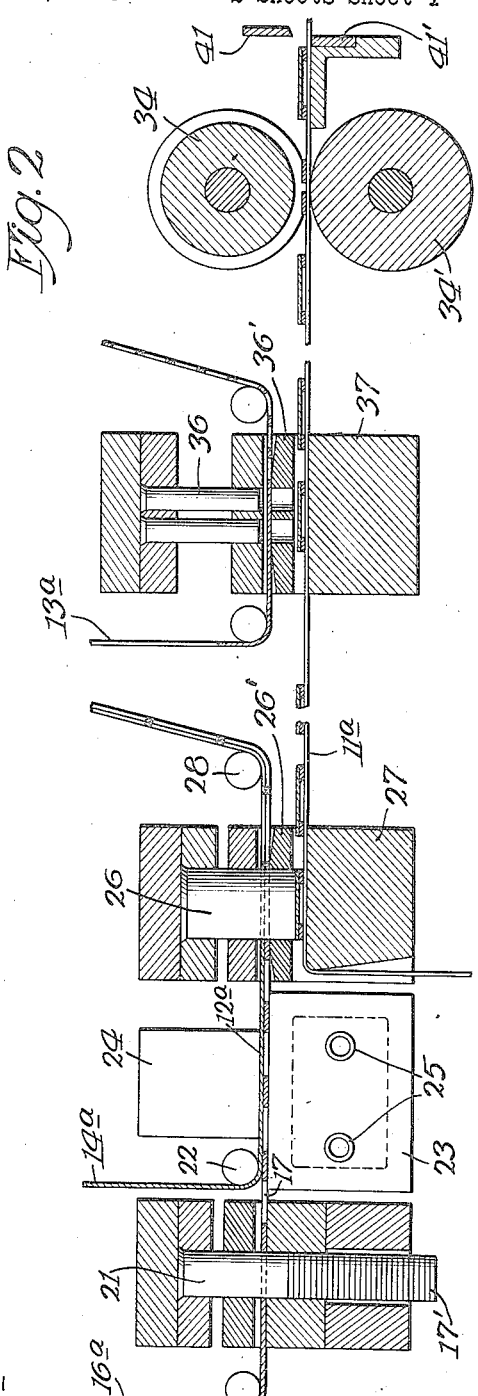
Inventor
William M. Scholl
By Rector, Hibben, Davis & Macauley
Attys March 10, 1936.  W. M. SCHOLL  2,033,553
METHOD OF MAKING AND MOUNTING ADHESIVE FOOT TREATMENT ARTICLES
Filed Oct. 4, 1933   2 Sheets-Sheet 2
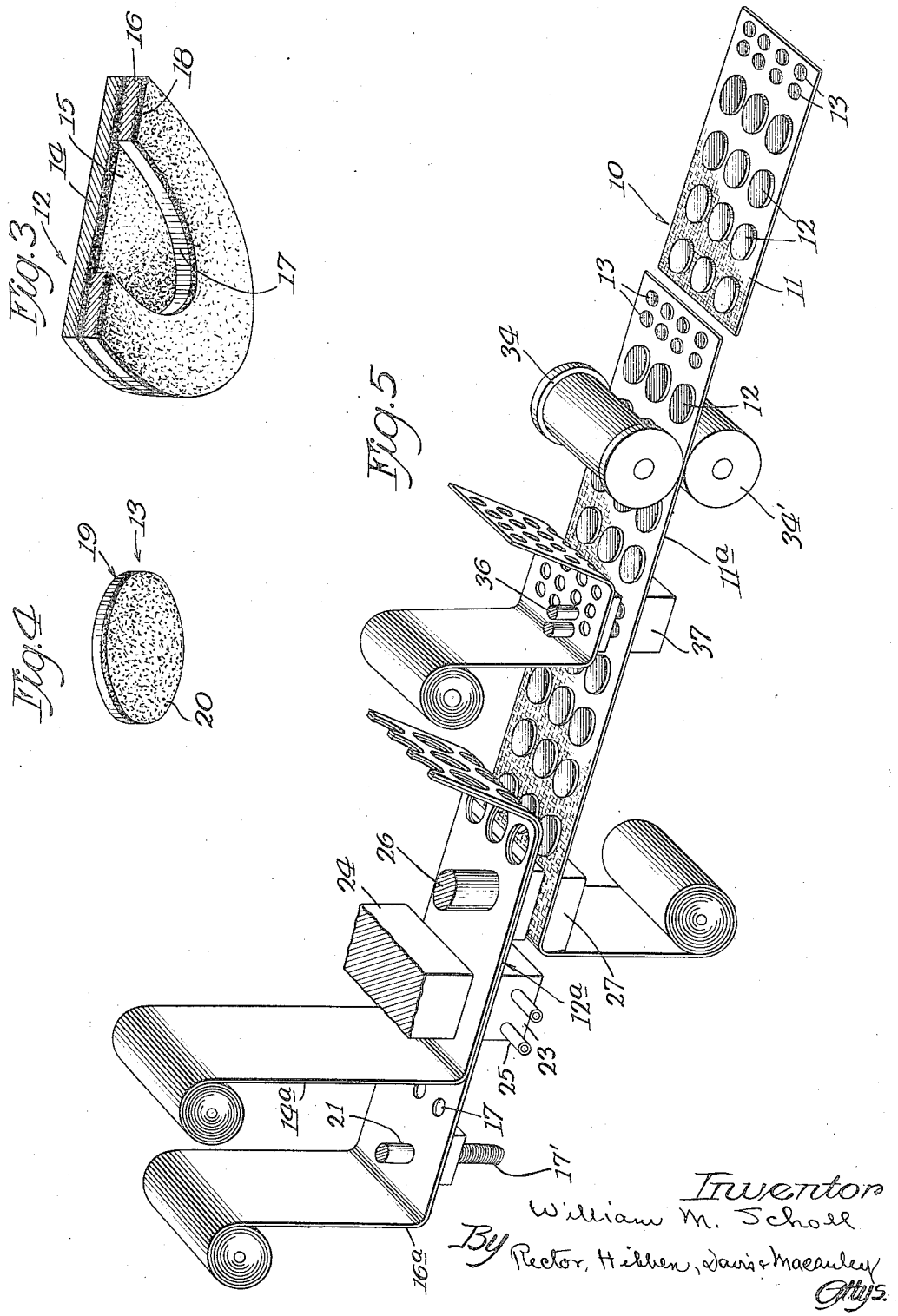
Inventor
William M. Scholl
By Rector, Hibben, Davis & Macauley
Attys.

Patented Mar. 10, 1936

2,033,553

UNITED STATES PATENT OFFICE 2,033,553

METHOD OF MAKING AND MOUNTING ADHESIVE FOOT-TREATMENT ARTICLES

William M. Scholl, Chicago, Ill., assignor to The Scholl Mfg. Co., Inc., Chicago, Ill., a corporation of New York Application October 4, 1933, Serial No 692,114

14 Claims. (Cl. 154—2)

My invention relates to the making of foot-treatment articles, and more particularly making recessed shielding-pads and suitably medicated plasters for use therewith, from stock-strips of adhesive-coated fabric, and the mounting of the articles adheringly on suitable carrier-strip material, such as an open-mesh gauze.

Among the general objects of my invention are, to improve over prior methods of making and mounting multiply, recessed shielding pads of adhesived fabric, such as are used to shield corns, callouses or other sensitive places on the foot; to promote uniformity and structural excellence of such products; and to facilitate and economize the production of a ready-to-package commercial article comprising a carrier strip of gauze on which are adheringly mounted a group of the pads and a separate group of thin, medicated plasters suitable for use in conjunction with respective pads, as for the medication of corns or callouses.

Pads which are intended to be used chiefly as shields are ordinarily composed of superimposed plies or layers of cotton fabric, closely woven or felted; each ply having on its under side a coating of plastic adhesive, whereby the bottom ply may be stuck to the carrying gauze or to the foot and each of the other plies is stuck to the one next below it; the uppermost ply or "outer section" of the pad being imperforate and the subjacent "center section" of one or more plies thickness being centrally apertured to provide the shielding recess.

The adhesive coating on each layer of the pad-fabric usually contains an antiseptic or soothing ingredient, such as zinc oxide, but the treatment of corns and calluoses is aided by the application of a suitable medicament, such as a salicylic acid compound, to the affected area additionally to shielding it from shoe-pressure; wherefore I provide for marketing, on the same carrier strip with a group of the pads as above stated, a group of small plasters, each receivable within a pad recess and made from thin woven fabric coated on its under side with a rather thick coating of suitable-medicated adhesive.

Heretofore, the known methods of making the multi-ply shielding pads from stock-strips of the adhesived fabric have involved the sticking of the fabric stock to an imperforate metal support, upon and through which progressive feeding of the stock is effected, and shaping the pad by knife-edged cutters which either strike against or roll against the surface of said support. Specifically, prior procedure has generally been to first mount the center-section stock adhesively on the support, then to cut a row of recess-outlines through the stock and clear the recess-apertures by picking out the waste center-pieces; next to place the "upper section" stock adheringly over the apertured center section strip, cut the pad outlines and thereafter strip off the "skeleton" of waste material, leaving the pads adhering to the metal support; thereafter to strip the pads from the support by means of a narrow scraper-knife; and lastly, as the loosened ends of the pads pass beyond the knife, to transfer the pads to and press them on the carrier-gauze.

Occasional pads produced by the stated practices are liable to have metallic particles imbedded in their adhesive-coated under surfaces; the nature of the cutting operations tending to occasional production of metal chips and the support-scraping action of the pad-stripping knife tending to transfer any loosened particles to the pads. Further, in cutting the pads with a rolling-cutter action, crushing and roughening of the edges of the pad is commonplace. A general object which I seek and attain is, to avoid these and other disadvantages of prior practices.

Furthermore, the recessed pads, built up as aforesaid, when made by prior practices, are quite commonly subject to the drawbacks, in use, of slippage between the stuck-together layers under the shifting pressures of the wearer's shoe, and of sticking to the wearer's stocking because of such slippage and consequent exposure of adhesived surfaces or because of exudation of any excess of the adhesive compound under the warmth and pressure of use. One of the more specific objects of my invention is to improve the pads themselves by promoting uniform, strong initimacy of adhesion between the layers to minimize likelihood of slippage, and uniform distribution of the adhesive compound, militating against exudation of the adhesive under conditions of use.

In the drawings:

Figure 1 is a diagrammatic illustration of the practice of my process, with some parts in side elevation and some in section;

Fig. 2 is an enlarged view showing some of the parts in different positions;

Fig. 3 is an enlarged bottom perspective of a fragment of a shielding pad;

Fig. 4 is an enlarged bottom perspective of a medicated plaster disk; and

Fig. 5 is a perspective view showing the several stock-strips in process of step-by-step manufacture, and the final assembled product.

Referring to the drawings, the assembly unit 10

(Fig. 5), ready for packaging, comprises a carrier strip 11 of open mesh fabric such as gauze, on which are adheringly mounted a desired number, say a dozen, of the recessed shielding-pads 12 arranged, say, three abreast in four transverse rows, and, as a separate group, a desired number of the smaller corn-treatment plasters 13 arranged, say, in two transverse rows occupying no more space on the strip than a row of pads. This arrangement may be termed a "5-position" assembly.

Each oval pad 12, in the form here shown, is of well-known type; 14 being the imperforate upper section or top layer of suitable fabric having a coating 15 of the plastic adhesive on its under side by which it is stuck to the center-section 16, which has a central opening 17 of suitable shape cut through it to provide the downwardly opening shielding recess and which has a bottom-coating 18 of the adhesive, detachably sticking it to the gauze 11.

According to the desired depth of the shielding recess, the apertured center-section 16 may be made from a single suitably thick ply of fabric or made up of two or more plies of stock preliminarily stuck together in ribbon form so that in either case the stock from which section 16 is made may be handled as a single strip in the production work.

Each small plaster unit 13 is here shown as a circular disk made from a single ply of quite thin, soft, looser woven fabric 19, rather thickly coated on its under side with the suitably medicated adhesive compound 20, and is of a size easily receivable in the shielding recess 17 of the pad.

In the practice of my production method herein illustrated, the cutting of pieces out of the respective strips of adhesived stock from which the pads 12 and the disks 13 are made, is done wholly by punching; the punched-out pieces being bodily removed from the plane of the stock strip, and those movable punches which strike out completed units—whether recessed pads or medicated plasters—being moved far enough, in prolongation of each cutting stroke, to transfer the cut-out units to, and strike them into adhering contact with, the carrier-strip stock in their intended and final position thereon, so that after the finished units have thus been mounted the carrier-strip stock has only to be cut into its appropriate lengths to complete the commercial assemblies 10.

In the procedure specifically illustrated, the stock-strip 16$^a$ for the center section of the shielding pads 12 is led from its rotatable spool to pass under the vertically reciprocatable gang of flat-ended punching dies 21 and be supported on the complemental die-block 21', which is apertured for coaction with the gang of punches in cutting the fabric. This stock-strip is fed forward step by step, and during each dwell between forwarding movements the punching-gang 21 is reciprocated, to cut a row of recess-apertures 17 in the stock and withdraw.

The waste pieces 17', so punched out, remain in the lower-die orifice below its top surface or cutting-level, and successive punching operations, stacking the waste pieces in lightly adhering relation, feeds the waste-stack down toward a waste receptacle 17$^w$. After this aperture-cutting operation, the punched stock 16$^a$ is fed forward and the upper-section stock 14$^a$, drawn from its supply roll, is adheringly superimposed on it, with its side edges registering with those of strip 16$^a$, so that from the point where roller 22 (Fig. 1) brings these stock-strips into adhesion, the combined or "full section" stock 12$^a$ is fed forward as a single thick strip.

It is very desirable, both for facilitating the manufacturing process and for betterment of the pads produced, that the full-section stock be hammer-compacted to a certain extent before being subjected to the action of the dies which punch out the finished pads. To this end the full-section stock 12$^a$ is passed over a supporting anvil 23 and during each dwell in its step-by-step progression a flat-ended hammer 24 is reciprocated, to pound the stock against the anvil; the throw of the hammer being limited, preferably, so that maximum depression will bring it to a predetermined plane spaced from the anvil by a distance somewhat less than the initial thickness of the multi-ply stock 12$^a$. The striking area of the hammer is at least as great as, and preferably somewhat longer than, the space occupied by a row of pads, and the brief, sharply-compressive action of the hammer, thus applied over quite a large area of the stock, serves very effectively to insure intimate and uniform adhesive union between the fabric layers by a strong tendency to thin and uniformize the adhesive film and to enforce better impregnation of surface fibers of the confronting fabrics.

This hammering of the stock, while not essential to the practice of my invention in its broader aspects, I find to be very beneficial, not only in its practical insurance that the plies will not slip under feeding action, but also in the pads made from the compacted strip; the likelihood of exudation of the adhesive compound, and of layer-slippage, being materially reduced under conditions of use.

In order to minimize or obviate adhesion of the hammered stock 12$^a$ to the anvil 23, the anvil is chilled, preferably to below-freezing temperatures, as by circulating a refrigerant through its hollow center via pipes 25.

After combining the center-section stock 16$^a$ and the upper-section stock 14$^a$ into the full-section stock 12$^a$—and preferably hammering the stock as described,—the multiply stock 12$^a$ is fed to the pad-punching dies 26, 26', each feeding step bringing a row of the holes 17, in the center-section of the full-section stock, into vertical register with the middle of the reciprocable punching-die 26. At this station the cooperative die-block 26' is quite shallow, and below its orifice is a table or anvil 27 over which the carrier-strip stock, led from its supply roll, is fed step-by-step, with dwells synchronizing with dwells of stock-strip 12$^a$—so to insure that the carrier-strip is at rest whenever the pads are being cut from the full-section stock-strip 12$^a$.

During each dwell of the full-section stock-strip 12$^a$ the punch-gang 26 is reciprocated, its stroke being prolonged beyond cutting position, so that, as illustrated in Fig. 2, the bottom of each punch passes below its coacting die-block 26' and smartly strikes the severed pad into adhesive engagement with the carrier-strip stock 11$^a$ which is receptively positioned by the table or anvil 27 directly below the dies.

As a result the pads themselves are normally characterized by neatly square-cut edges, and the "flatwise" mounting of them (so to term it) on the carrier-strip insures uniformized, firm adhesion of the pads to the carrier-gauze and substantial avoidance of any unsightly depression of the upper section into the recess of the lower section.

The "skeleton" of full-section stock 12ª is guided, as by guide-rollers 28, to a suitable feeding mechanism 29 including a feed-roller 30, to be operated step-by-step as through actuation of a ratchet 31; the feed roller 30 preferably cooperating, in well-known fashion, with a waste-takeup roller 32, whose load of rolled-up "skeleton" tape is gravity-held in coaction with feed-rollers 30.

The gauze-stock 11ª is drawn forward by marginal feed-rollers 34, 34', which, for making the "5-position" product 10 herein illustrated, are actuated through ratchet 35 to give five step-lengths of advance to the gauze-stock between operations of the gauze-cutting shears 41, 41' to which the feed-rollers deliver the stock while the pad-punches 26 are operated only four times, during dwells of the gauze-stock, to load four of the five positions or step-spaces on the gauze with pads and leave a fifth space vacant for reception of the desired supply of medicated plasters 13.

Between the pad-making station and the gauze-feeding rollers, the gauze-stock 11ª passes under the plaster-cutting dies 36, 36' and over a positioning table or anvil 37 directly below them; and, during a dwell in the gauze-feeding which positions a vacant space on table 37, the double-row gange of plaster punches 36 is reciprocated to punch the medicated disks 13 from the suitable stock-strip 13ª and mount them adheringly on the gauze; this punch-gang 36 being operated only once during the 5-step-lengths of advance of the gauze and the feed-rolls 38 for the stock-strip 13ª of plaster-material being advanced one step after each cutting stroke of the pad-punches 36 and actuating, through the skeleton of the plaster-material strip, the skeleton-winding-drum 40.

Manifestly, the manufacturing procedure hereinbefore described may best be practiced by mechanical corelation of the several production-steps in timed cycles of operation, for most-rapid performance of methodic steps, herein stated.

I claim:

1. The method of making a foot-treatment unit from sticky-coated fabric and affixing it to a carrier strip, consisting in forcing a punch through the fabric-stock to sever the unit therefrom and then continuing the movement of said punch to press the severed unit into adhering contact with the carrier strip.

2. The method of making a recessed foot-treatment pad and affixing it to a carrier strip, consisting in feeding to a punch a multi-ply stock-piece having a recess-apertured bottom layer of fabric adhesive-coated on its under side and an imperforate upper-section layer adheringly mounted on said bottom layer, and forcing the punch through both said layers to sever a pad, and then continuing the movement of said punch, carrying with it the pad, to transfer said pad to and press it into adhesion with the carrier strip.

3. The method of making a recessed pad from layers of adhesive-coated material and affixing the pad to a carrier strip, consisting in forcing a punch through a layer of said material to form a recess-aperture therein; overlying said punched layer with another adhesive-coated layer of material; and forcing a punch through both said layers; and then continuing the movement of said second punch to transfer said pad to and press it into adhesion with the carrier strip.

4. The method of making a recessed pad from superimposed layers of adhesive-coated material and affixing it to a carrier strip, consisting in feeding to a pad-cutting punch multi-layer fabric stock apertured in its lower layer and having adhesive material connecting the superimposed layers and adhesive material coating the under side of the bottom layer; registering the lower-layer aperture with the punch; forcing said punch through both layers to sever the pad from and bodily displace it from the plane of the stock-material, and then continuing the movement of said punch to transfer said pad to and press it into adhesion with the carrier strip.

5. The method of making a foot-treatment article from adhesive-coated fabric and affixing it to a carrier strip, consisting in placing carrier-strip stock, and article-stock adhesive coated on its under side, respectively on an anvil and on an apertured die in aligned but separated relation; forcing a substantially flat-ended punch through the article-material and the die aperture to cut out the article and bodily displace it from the plane of the article-stock, and then continuing the movement of said punch to transfer the severed article to and press its adhesive-coated underside into adhesion with the carrier-material.

6. The method of making a foot-treatment pad from layers of fabric each adhesive-coated on its under side and affixing the pad to a carrier strip, consisting in forcing a punch through a piece of bottom-layer stock to cut out a recess-forming center and bodily displace the same below the plane of said stock; applying to said apertured stock an imperforate upper stock-layer to adhere to the punched layer; registering the hole in the punched layer of said combined stock pieces with a second punch of larger area, forcing said second punch through both stock layers to cut out the pad; and then continuing the movement of said second punch to transfer the severed pad to and press it into adhesion upon the carrier strip.

7. The method of making a corn pad from layers of adhesived material and affixing it to a carrier strip, consisting in forcing a punch through a layer of said material; moving the punched layer into alignment with a second layer and hammering the second layer into adhering connection therewith; forcing a second, larger-area punch through the adhesively-connected layers to sever a pad therefrom; and then continuing the movement of said second punch to cause it to transfer the pad to and firmly impress it into adhering contact with the carrier-strip.

8. In the process of making foot-treatment shielding-pads, the steps of bringing stock-layers, each adhesive coated on its under side, into superimposed relation; hammering said adhesive-coated plies into adhering engagement; and cutting the desired article from the hammered stock.

9. In the manufacture of foot-treatment articles from superimposed layers of adhesive-coated stock-strips, the steps of bringing said stock-strips, each adhesive-coated on its under side, into superimposed relation above a chilled anvil; hammering said stock-strip into adhering union against said adhesion-resistive chilled anvil; and cutting said foot-treatment articles from said so-compacted stock.

10. A method of making assembly-articles each comprising a carrier-strip of open mesh material having adhesively mounted thereon a group of multi-ply, bottom-recessed adhesive pads and a separate group of thin, medicated adhesive plasters each receivable in a pad-recess, which comprises feeding step by step in the same direction, with synchronized dwell-periods, strips of carrier-material, center-section stock, upper-section stock and plaster-stock, each of which three stock-strips is adhesive-coated on its under-side; and progressively, at successive stations, punching apertures through the lower-section stock and by the punches removing the waste material from said stock; adhesively-combining into a full-section stock-strip the lower-section stock and the upper-section stock; punching complete pads from said full-section stock and mounting them adhesively on the carrier fabric in rows; punching rows of complete plaster units from the plaster-stock and by the punches mounting them in rows adheringly on the carrier strip in a group spaced between groups of the pads; and cutting the carrier-strip into lengths each containing a group of said plasters and a group of said pad-rows.

11. The process of making corn pads and the like consisting in feeding three fabric webs, in perforating one of said webs and adhesively uniting it with a second web, and in punching corn pads from the two webs thus united and forcing them out of the united webs into contact with the third web to adhesively attach them thereto.

12. The process of making corn pads and the like consisting in feeding a strip composed of textile fabric provided with a sticky surface, punching groups of perforations in the strip and forcing the waste pieces out of the perforations by the punching operation, adhesively applying another textile fabric strip over the back of the first, punching out pads from the composite strip thus formed and forcing the punched-out pads from the composite strip by the punching operation, feeding a carrier strip of fabric parallel to the composite strip, adhesively attaching the punched-out pads to the carrier-fabric by causing them to be pressed against it by the punch which punches them out of the composite strip, and severing the carrier fabric into lengths.

13. The process of making corn pads and the like consisting in feeding a strip of textile fabric with a sticky surface, punching respective groups of spaced perforations in the strip and at the same time ejecting the waste centers of each group of perforations out of the web, punching out plasters from the perforated strip, and by each punching operation forcing a group of plasters bodily out of and away from the strip and bringing the stick surface of each thereof into forcible contact with the surface of a carrier strip to stick thereon.

14. The process of making and mounting corn pads and the like consisting in feeding, in separated, face-to-face relation an adhesive-faced strip of fabric from which the pads are to be made and a carrier strip on which the adhesive face of the pad fabric is to be stuck, punching the pads from said fabric strip and forcing it away from said strip and into contact with the carrier strip, and chilling the adhesive face of the first said strip just before subjecting said strip to said punching.

WILLIAM M. SCHOLL.